Patented Dec. 8, 1936

2,063,162

UNITED STATES PATENT OFFICE 2,063,162

PRODUCTION OF CYCLIC TERPENE ALCOHOLS

Clyde O. Henke, Wilmington, Del., and Gastao Etzel, Pitman, N. J., assignors to E. I. du Pont de Nemours & Company, Wilmington, Del., a corporation of Delaware No Drawing. Application September 19, 1934, Serial No. 744,738

10 Claims. (Cl. 260—153)

This invention relates to cyclic terpene alcohols, more particularly borneol and isoborneol, and a process for the preparation thereof from their esters.

It is known that cyclic terpene alcohols may be prepared from their esters by saponification with caustic alkali. Previously proposed processes, however, are relatively unsatisfactory because of side reactions resulting in the formation of unsaturated terpene hydrocarbons.

The present invention has for an object the provision of a new and improved process for the preparation of cyclic terpene alcohols from their esters, which is comparatively free from side reactions such as the formation of unsaturated terpene hydrocarbons. A further object is to provide a method for saponifying esters of cyclic terpene alcohols which is simple to operate and to control. A still further object is to provide for saponifying esters of cyclic terpene alcohols which lessens the time required as compared with previous methods. An additional object is to provide a process for the saponification of esters of cyclic terpene alcohols which simplifies the recovery of the desired products. Other objects will appear hereinafter.

These objects may be accomplished by carrying out the saponification of the ester of the cyclic terpene alcohol in aqueous alkaline solution in the presence of a water-immiscible, preferably relatively volatile solvent for the formed terpene alcohol. The ester treated may be in the form of the crude mixture obtainable, for example, by the esterification of the corresponding cyclic terpene hydrocarbon with an organic acid in the presence of sulfuric acid. The invention is also applicable to the treatment of a mixture of esters.

The invention will be further illustrated but is not limited by the following example, in which the quantities are stated in parts by weight.

Example

To a solution consisting of 9200 parts of 28.5% caustic soda, 1150 parts of benzene are added. The mixture is cooled and an esterification mass (prepared from 4300 parts of camphene, 2444 parts of 90% formic acid and 610 parts of 93% sulfuric acid and consisting essentially of isobornyl formate with the acids and water) is added, keeping the temperature below 50° C. The mixture is then autoclaved at 130° C. for three hours under about 60 pounds per square inch (gauge) pressure.

When the ester is first added to the benzene-caustic soda mixture, considerable heat is formed, principally because of the excess of sulfuric and formic acids present in the ester. As soon as the ester comes in contact with the caustic soda, it begins to saponify, forming isoborneol, which is a solid material (M. P. 214° C.). The solvent present dissolves the isoborneol, permitting continued contact of the still unsaponified ester with the caustic soda, and thus avoiding local over-heating of the mass and decomposition of the ester. In this manner the ester is free to come in contact with the caustic soda solution, thus reducing the time of saponification.

An excess of caustic soda is preferably added. This excess usually amounts to approximately 10% of that required to saponify the ester and, also, to neutralize the excess acid present.

Acetic acid may be the ester-forming acid as well as formic acid. Esters of other acids such as propionic, succinic, phthalic, might be saponified in a similar manner. The invention has been found to be particularly advantageous when the ester-forming alcohol is borneol or isoborneol, but it will be understood that it is applicable to the preparation of other cyclic terpene alcohols, for example fenchyl alcohol.

Instead of sodium hydroxide the saponifying agent may be another alkali, as, for example, potassium hydroxide, mixtures of potassium and sodium hydroxide, lime or magnesium oxide.

The solvent preferably used in our process is a mixture of cyclohexane and benzene. This may be replaced by pure benzene or cyclohexane, toluene or commercial xylenes or any other water-immiscible solvent which will readily dissolve the formed terpene alcohol, and preferably which is at least as volatile with steam as the terpene alcohol.

The saponification temperatures may vary widely as will be apparent to those skilled in the art. The temperature of 130° C. given in the example for the saponification has given good results, but both lower and higher temperatures may be used.

The pressure during the saponification is also subject to variation. Super-atmospheric pressures, for example, the autogenous pressure developed by carrying out the reaction in a closed vessel, have given especially desirable results. Atmospheric pressures may be employed provided suitable steps are taken to prevent loss of the solvent, for example, by the choice of a solvent boiling above the saponification temperature or by refluxing.

The terpene alcohol and solvent may be recovered in any suitable manner, preferably by steam-distillation. This is preferably accomplished as follows:

The high melting cyclic terpene alcohol is steam-distilled directly into a receiver which contains a water-immiscible, low-boiling solvent. The receiver is equipped with a vertical reflux condenser. As the material is steam-distilled, the solvent is refluxed in the condenser. Thus, it washes down into the receiver any solid material which condenses on the wall of the condenser. The solvent may be the same as employed in the saponification. For instance, in the example the benzene would be distilled off first by the steam-distillation, condensed and returned to the receiver. As the distillation proceeds, benzene keeps refluxing in the condenser, washing down into the receiver any isoborneol which may collect in the condenser. The condensed water is collected in the receiver and may be separated from time to time as desired. The steam-distillation and condensation in the presence of the water-immiscible solvent is highly desirable in preventing plugging of the condenser with the normally solid cyclic terpene alcohol.

While the invention is not limited by any theory, it appears that the use of a solvent to dissolve the terpene alcohols such as isoborneol or borneol, which are solid at the temperature of saponification, gives the ester better opportunity to come in uniform contact with the alkali. This prevents local over-heating of the mass which is injurious in that under such conditions saponification is partially replaced by a splitting-off of the entire acid molecule, resulting in the formation of unsaturated hydrocarbons such as camphene. The formation of camphene and other unsaturated hydrocarbons instead of isoborneol is extremely undesirable since it not only decreases the yield of the product desired but the conversion of the impure isoborneol thus produced into useful products such as camphor is rendered more difficult and expensive.

Among the advantages of the invention are the following: It keeps the reaction mass liquid and thus prevents over-heating and decomposition of the ester into unsaturated hydrocarbons such as camphene. It simplifies the control of the saponification in that uniformity is maintained throughout the mass and thus moderate changes of temperature and pressure do not adversely affect the result. It decreases the time required for saponification to half or less that necessary without the solvent. It aids the subsequent steam-distillation as set forth in the above description.

As many apparent and widely different embodiments of this invention may be made without departing from the spirit and scope thereof, it is to be understood that we do not limit ourselves to the specific embodiments thereof except as defined in the following claims.

We claim:

1. The process of producing isoborneol which comprises saponifying an ester of isoborneol with an aqueous alkaline solution in the presence of a water-immiscible solvent for the isoborneol.

2. The process of producing isoborneol which comprises saponifying an ester of isoborneol with an aqueous alkaline solution in the presence of a water-immiscible solvent for the isoborneol, said solvent being at least as volatile with steam as isoborneol, and steam-distilling the mixture.

3. The process of producing isoborneol which comprises saponifying a formic acid ester of isoborneol with aqueous alkaline solution in the presence of a water-immiscible solvent for isoborneol, which is more volatile with steam than isoborneol, and steam-distilling the mixture.

4. The process of producing isoborneol which comprises saponifying a formic acid ester of isoborneol with an aqueous solution of caustic soda in the presence of a water-immiscible solvent sufficient in amount to dissolve the isoborneol as fast as it is formed.

5. The process as claimed in claim 4 in which the saponification is effected under super-atmospheric pressure.

6. The process of producing isoborneol which comprises saponifying the formic acid ester of isoborneol with a caustic alkali solution in the presence of benzene as a solvent for the isoborneol.

7. The process of producing isoborneol which comprises reacting together camphene, formic acid and sulfuric acid to produce an esterification mixture comprising essentially isoborneol formate, acids and water, adding said mixture to a mixture of an aqueous caustic alkali solution and benzene at a temperature below about 50° C., and then heating the resultant mixture in a closed vessel to a temperature of about 130° C.

8. The process of producing cyclic terpene alcohols which comprises saponifying esters of cyclic terpene alcohols with an aqueous alkaline solution in the presence of a water-immiscible solvent for the formed terpene alcohol which is more volatile with steam than the said terpene alcohol, then subjecting the saponification mixture to steam-distillation whereby the more volatile solvent is first distilled, followed by the cyclic terpene alcohol, and conducting the distillate into a receiver provided with a reflux condenser maintained at a temperature sufficient to condense the solvent whereby the solvent washes down any solid cyclic terpene alcohol collecting in the condenser.

9. In a process of producing cyclic terpene alcohols by the saponification of esters of cyclic terpene alcohols in the presence of a saponifying alkali, the step which comprises adding an esterification mixture comprising essentially a cyclic terpene alcohol ester, free acid and water to a mixture of an aqueous saponifying alkali solution and a water-immiscible solvent for the formed terpene alcohol, with cooling.

10. In a process of producing isoborneol by the saponification of isoborneol formate with a caustic alkali, the step which comprises adding an esterification mixture comprising essentially isoborneol formate, free acid and water to a mixture of an aqueous caustic alkali solution and an aromatic hydrocarbon solvent, with cooling.

CLYDE O. HENKE.
GASTAO ETZEL.